US011601080B2

(12) United States Patent
Sasaki et al.

(10) Patent No.: US 11,601,080 B2
(45) Date of Patent: Mar. 7, 2023

(54) MOTOR CONTROL DEVICE

(71) Applicant: Panasonic Intellectual Property Management Co., Ltd., Osaka (JP)

(72) Inventors: Ryuta Sasaki, Osaka (JP); Toru Tazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/290,721

(22) PCT Filed: Oct. 16, 2019

(86) PCT No.: PCT/JP2019/040558
§ 371 (c)(1),
(2) Date: Apr. 30, 2021

(87) PCT Pub. No.: WO2020/100497
PCT Pub. Date: May 22, 2020

(65) Prior Publication Data
US 2022/0006403 A1 Jan. 6, 2022

(30) Foreign Application Priority Data
Nov. 16, 2018 (JP) .............................. JP2018-215748

(51) Int. Cl.
*H02P 21/00* (2016.01)
*H02P 21/20* (2016.01)
*H02P 21/18* (2016.01)

(52) U.S. Cl.
CPC .......... *H02P 21/0089* (2013.01); *H02P 21/18* (2016.02); *H02P 21/20* (2016.02)

(58) Field of Classification Search
CPC ....... H02P 21/0089; H02P 21/18; H02P 21/20
See application file for complete search history.

(56) References Cited

U.S. PATENT DOCUMENTS

2010/0301788 A1 12/2010 Chen et al.
2011/0025238 A1* 2/2011 Ueda .................. H02P 21/0089
318/400.02
(Continued)

FOREIGN PATENT DOCUMENTS

| EP | 1729407 A1 * | 12/2006 | .......... H02P 21/0003 |
|----|--------------|---------|------------------------|
| EP | 1729407 A1   | 12/2006 |                        |
| JP | 5948613 B    | 7/2016  |                        |

OTHER PUBLICATIONS

International Search Report of PCT application No. PCT/JP2019/040558 dated Dec. 24, 2019.
(Continued)

*Primary Examiner* — Muhammad S Islam
*Assistant Examiner* — Bradley R Brown
(74) *Attorney, Agent, or Firm* — McDermott Will & Emery LLP (57) ABSTRACT

A motor control device controls a current of a motor based on a torque command, the current being separated into a d-axis current and a q-axis current orthogonal to the d-axis current, the torque command being a target value of a torque of the motor. The motor control device includes a current vector controller that receives input of a d-axis current command and a q-axis current command, and generates a d-axis voltage command and a q-axis voltage command, a difference between a value of the d-axis current and a value of the d-axis current command being zero, a difference between a value of the q-axis current and a value of the q-axis current command being zero, a q-axis current command generator that generates the q-axis current command based on the torque command, a magnetic-flux weakening controller that generates the d-axis current command based on a difference between a voltage command and a reference voltage, the voltage command being a vector with the d-axis voltage command output from the current vector controller
(Continued)

as a d-axis component and the q-axis voltage command as a q-axis component, an amplitude of the voltage command not exceeding the reference voltage, a current limiter that limits a magnitude of the d-axis current command according to a magnitude of the q-axis current command, the d-axis current command being a d-axis component of a current command vector of the motor, the q-axis current command being a q-axis component of the current command vector of the motor, a magnitude of the current command vector of the motor not exceeding a current limit value, and a reference voltage correction unit that corrects the reference voltage based on a difference between a value of the d-axis current command before limitation and a value of the d-axis current command after the limitation.

2 Claims, 3 Drawing Sheets (56) References Cited

U.S. PATENT DOCUMENTS

| 2014/0152207 | A1* | 6/2014 | Sasaki | H02P 21/22 318/400.02 |
| 2014/0312812 | A1* | 10/2014 | Sasaki | H02P 21/0089 318/400.02 |

OTHER PUBLICATIONS

Communication pursuant to Article 94(3) EPC dated Oct. 12, 2022 for the related European Patent Application No. 19883375.8.

* cited by examiner

MOTOR CONTROL DEVICE

TECHNICAL FIELD

The present invention relates to a motor control device using current vector control. The present invention particularly relates to a technique of performing magnetic-flux weakening control or overmodulation control to drive a motor in the vicinity of a voltage saturation region.

BACKGROUND ART

Generally, as a method of controlling a winding current of a permanent magnet synchronous motor, vector control is used in which the winding current of the motor is separated into a d-axis component in a rotor magnetic flux direction and a q-axis component orthogonal to the d-axis component to perform control. A current controller that performs the vector control receives an external command and calculates the value of a voltage command for a motor drive unit that supplies power to the motor.

In a case such as where the value of the external command is large, the value of this voltage command may exceed a suppliable voltage of the motor drive unit. This phenomenon is called voltage saturation. The voltage saturation is more likely to occur as the drive speed of the motor increases. This is because an induced voltage generated during the drive of the motor increases in proportion to the drive speed, and a voltage between terminals of the motor also increases to compensate for the increase in the induced voltage with a supply voltage. Also in a case where a load of the motor is large or a power supply voltage is low, a supply voltage margin is small, and thus the voltage saturation is more likely to occur.

When the voltage saturation occurs in the motor during power running operation, the torque cannot be generated and the speed cannot be increased. In addition, as a secondary effect, an integral term of the current controller or a speed controller may wind up and a response may deteriorate.

As a means for suppressing the voltage saturation, magnetic-flux weakening control is used in which a negative d-axis current is passed to weaken a magnetic flux generated by a permanent magnet and suppress the increase in the induced voltage.

However, if the negative d-axis current is increased, a reaction magnetic field causes irreversible demagnetization of the permanent magnet to occur or the efficiency of the motor to deteriorate. Thus, the magnitude of the d-axis current may be limited.

Furthermore, since each of the motor and an inverter that drives the motor has an upper limit of the current that can be energized, the magnitude of a combined current, which is the sum of the d-axis current and a q-axis current, may also be limited.

Such magnetic-flux weakening control under the limitation of the d-axis current and the limitation of the combined current is described in, for example, PTL 1. In the method disclosed in PTL 1, a d-axis current command is generated based on a difference between the value of a voltage command and a predetermined reference value. An external target command value or a q-axis current command value is limited based on the amount by which the d-axis current command exceeds a negative limit value. Furthermore, PTL 1 shows a technique provided with a current limiter that limits the magnitude of the q-axis current command according to the magnitude of the d-axis current command so that the magnitude of a current command vector of the motor, which is the sum of the d-axis current command and the q-axis current command, does not exceed a predetermined value.

The technique of PTL 1 performs processing of reducing the value of the q-axis current command when the magnitude of the combined current, which is the sum of the value of the d-axis current command and the value of the q-axis current command, reaches the predetermined value. Therefore, the larger the value of an initial q-axis current command, the smaller the room for increasing the value of the d-axis current command, and it is difficult to obtain the effect of the magnetic-flux weakening control. Therefore, the larger torque an operating region requires, the more difficult it is to increase the speed with the torque maintained.

CITATION LIST

Patent Literature

PTL 1: Japanese Patent No. 5948613

SUMMARY OF THE INVENTION

The present invention has been made to solve the above conventional problem. An object of the present invention is to provide a motor control device capable of increasing the speed even in an operating region where a d-axis current cannot sufficiently flow due to current limitation, and further bringing the out output of the motor.

In order to achieve the above object, a motor control device of the present invention controls a current of a motor based on a torque command, the current being separated into a d-axis current and a q-axis current orthogonal to the d-axis current, the torque command being a target value of a torque of the motor. This motor control device includes a current vector controller, a q-axis current command generator, a magnetic-flux weakening controller, a current limiter, and a reference voltage correction unit. The current vector controller receives a d-axis current command and a q-axis current command, and generates a d-axis voltage command and a q-axis voltage command, a difference between a value of the d-axis current and a value of the d-axis current command being zero, a difference between a value of the q-axis current and a value of the q-axis current command being zero. The q-axis current command generator generates the q-axis current command based on the torque command. The magnetic-flux weakening controller generates the d-axis current command based on a difference between a voltage command and a reference voltage, the voltage command being a vector with the d-axis voltage command output from the current vector controller as a d-axis component and the q-axis voltage command as a q-axis component, an amplitude of the voltage command not exceeding the reference voltage. The current limiter limits a magnitude of the d-axis current command according to a magnitude of the q-axis current command, the d-axis current command being a d-axis component of a current command vector of the motor, the q-axis current command being a q-axis component of the current command vector of the motor, a magnitude of the current command vector of the motor not exceeding a current limit value. The reference voltage correction unit corrects the reference voltage based on a difference between a value of the d-axis current command before limitation and a value of the d-axis current command after the limitation.

According to this configuration, in a case where a combined current value, which is the sum of the value of the d-axis current command and the value of the q-axis current command, reaches the current limit value, the reference voltage correction unit corrects the reference voltage at the time of magnetic-flux weakening control. Therefore, even in the operating region where the d-axis current cannot sufficiently flow due to the current limitation, an output voltage is increased, which can increase the speed.

Furthermore, in this configuration, in a situation where the speed of the motor increases, the correction of the output voltage is subordinated to the magnetic-flux weakening control, and the magnetic-flux weakening control is preferentially performed. Therefore, in a case where the output voltage is overmodulated to increase the speed of the motor, an operating region where the overmodulation is performed can be made smaller than an operating region where the magnetic-flux weakening control is performed, and a region where a harmonic component associated with the overmodulation is generated can be suppressed to be small.

Furthermore, it is preferable that the motor control device of the present invention further includes a reference voltage limiter that limits the reference voltage by a predetermined upper limit value, and a command correction unit that performs correction to decrease the q-axis current command or the torque command when the amplitude of the voltage command is larger than the predetermined upper limit value.

According to this configuration, the q-axis current command or the torque command is corrected so that the amplitude of the value of the voltage command output from the current vector controller does not exceed the upper limit value of the output voltage. Therefore, in a case where a torque command exceeding an output limit of the motor is input, the current command to the current vector controller is automatically corrected to a vector according to the output limit of the motor, and stable current control can be maintained.

As described above, according to the motor control device of the present invention, even in the operating region where the d-axis current cannot sufficiently flow due to the current limitation, it is possible to increase the speed, and further bring out the output of the motor.

DESCRIPTION OF EMBODIMENT

Hereinafter, a motor control device according to an exemplary embodiment of the present invention will be described with reference to the drawings. Note that each of the exemplary embodiments described below shows a preferred specific example of the present disclosure. Thus, the numerical values, shapes, materials, components, arrangement positions and connection forms of the components, and the like shown in the following exemplary embodiment are examples, and are not intended to limit the present disclosure. Therefore, among the components in the following exemplary embodiment, components not described in the independent claim indicating the highest level concept of the present disclosure will be described as optional components.

The drawings are schematic diagrams and are not necessarily exactly illustrated. Therefore, the scales and the like do not always match in the drawings. In the drawings, substantially the same components are designated by the same reference marks, and duplicate description will be omitted or simplified.

Exemplary Embodiment

Figure 1:
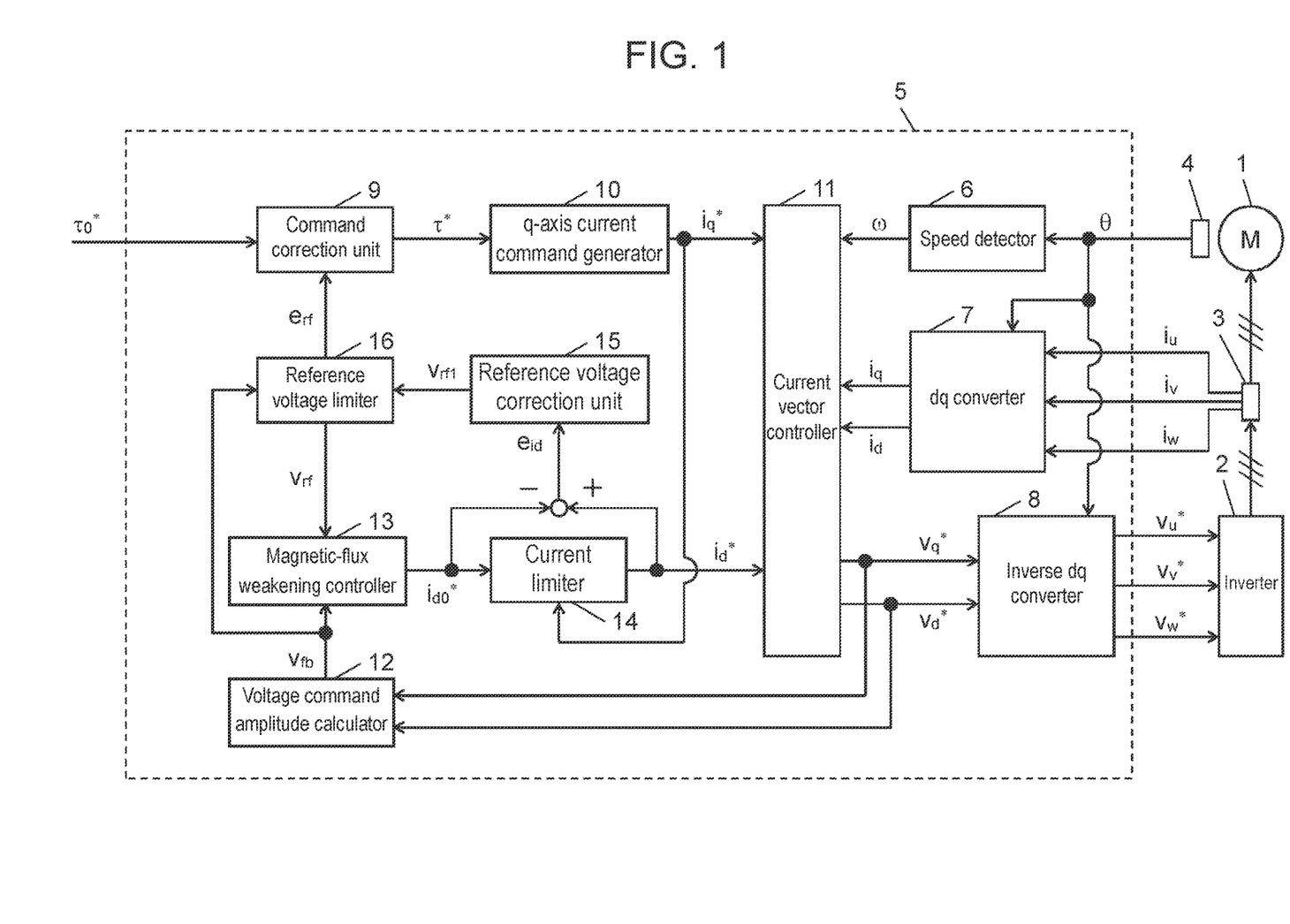
FIG. 1 is a functional block diagram of a motor drive system to which a motor control device according to an exemplary embodiment of the present invention is applied.

FIG. 1 is a functional block diagram of a motor drive system to which a motor control device according to an exemplary embodiment of the present invention is applied. As illustrated in FIG. 1, the motor drive system of the present exemplary embodiment includes motor 1, inverter 2, current detector 3, position detector 4, and motor control device 5. Motor control device 5 controls inverter 2 so that the torque of motor 1 matches a torque command $\tau_0^*$ input from an upper controller (not illustrated).

In the present exemplary embodiment, as an example of motor 1, a permanent magnet synchronous motor including a rotor holding a permanent magnet and a stator in which a winding is wound will be described.

Inverter 2 performs semiconductor switching according to a voltage command generated by motor control device 5, converts a DC voltage from a power source (not illustrated) into an alternating current, and supplies the alternating current as a drive voltage to motor 1. In this way, inverter 2 supplies power to motor 1. The switch configuration and switching method inside inverter 2 are not particularly limited as long as the configuration and the method are suitable for the purpose of driving motor 1.

Current detector 3 directly detects phase currents $i_u$, $i_v$, and $i_w$ flowing in the three-phase winding of motor 1, and outputs signals corresponding to the phase currents $i_u$, $i_v$, and $i_w$. The currents may be detected at any part as long as the phase currents $i_u$, $i_v$, and $i_w$ can be estimated. For example, phase currents of only two phases may be directly detected, and a phase current of the remaining one phase may be obtained by calculation. Alternatively, current detector 3 may be inserted into a DC bus (not illustrated) of inverter 2 to detect a bus current, and the phase currents $i_u$, $i_v$, and $i_w$ may be estimated from the detected bus current.

Position detector 4 is attached to motor 1. Position detector 4 outputs a signal corresponding to a position θ of a rotor (not illustrated) of motor 1. In this way, position detector 4 detects the position θ of the rotor of motor 1. Note that, in a case where the position or speed of the rotor can be detected by estimation, position detector 4 is unnecessary.

In order to control the rotation of motor 1, motor control device 5 uses vector control in which a winding current of motor 1 is separated into a d-axis component in a rotor magnetic flux direction and a q-axis component orthogonal to the d-axis component to perform control. That is, motor control device 5 separates the current of motor 1 into a d-axis current and a q-axis current, which are orthogonal, and controls a current for energizing the winding of motor 1 based on current vector control.

Next, components of motor control device 5 will be described.

Speed detector 6 detects a drive speed ω of the motor based on the position θ of the rotor. However, sensorless control that detects the position θ of the rotor and the drive speed ω by estimation may be used. In the case of driving motor 1 by use of the sensorless control, the drive speed ω is calculated by use of the phase currents $i_u$, $i_v$, $i_w$ and voltage commands $v_d^*$, $v_q^*$ of motor 1, instead of using the output signal of position detector 4.

dq converter 7 calculates, from the phase currents $i_u$, $i_v$, and $i_w$ detected by current detector 3 and the position θ of the rotor detected by position detector 4, a d-axis current $i_d$ and a q-axis current $i_q$, which are detection currents of the d-axis and the q-axis, and outputs the d-axis current $i_d$ and the q-axis current $i_q$ to current vector controller 11.

Inverse dq converter 8 calculates, from the d-axis and q-axis voltage commands $v_d^*$ and $v_q^*$ input from current vector controller 11 and the position θ of the rotor detected by position detector 4, voltage commands $v_u^*$, $v_v^*$, $v_w^*$ corresponding to drive voltages applied to the phases of motor 1, and outputs the voltage commands $v_u^*$, $v_v^*$, $v_w^*$ to inverter 2.

In the present exemplary embodiment, dq converter 7 and inverse dq converter 8 perform absolute conversion in which the power of the three phases does not change before and after the conversion.

Furthermore, as described above, motor control device 5 is notified of the torque command $\tau_0^*$, which is a target value of the torque of the motor, from, for example, the upper controller (not illustrated). In motor control device 5, command correction unit 9 is notified of the torque command $\tau_0^*$. Command correction unit 9 performs correction to decrease the torque command $\tau_0^*$ based on a voltage limit difference $e_{rf}$ input from reference voltage limiter 16, and outputs a corrected torque command τ*.

q-axis current command generator 10 generates a q-axis current command $i_q^*$, which is a target value of the q-axis current, based on the corrected torque command τ* input from command correction unit 9, and outputs the q-axis current command $i_q^*$ to current vector controller 11 and current limiter 14. A generation method is not particularly limited, but for example, as shown in Equation (1), a calculation may be performed by use of a normal current command phase β and a normal current command amplitude I.

[Math. 1]

$$\begin{cases} i_q^* = I \cdot \cos\beta \\ I = f(\tau^*) \end{cases} \quad \text{Equation (1)}$$

Here, the normal current command phase β and the normal current command amplitude I are a phase and an amplitude of a current command in a normal operating region where voltage saturation does not occur. A function f is a function of the corrected torque command τ* for obtaining the normal current command amplitude I. The normal current command phase β, the normal current command amplitude I, and the function f need to be obtained in advance based on a relationship between the actual torque and the actual current vector of motor 1. The normal current command phase β may be a fixed value, or may be changed according to the drive speed ω and the corrected torque command τ* or the torque command $\tau_0^*$ in order to suppress a copper loss and an iron loss of motor 1. Note that the function f may be a mathematical expression or a numerical table based on the same expression.

Current vector controller 11 generates the d-axis voltage command $v_d^*$ so that an error, that is, a difference between the value of a d-axis current command $i_d^*$, which is a target value of the d-axis current, and the value of the d-axis current $i_d$ is zero. Furthermore, current vector controller 11 generates the q-axis voltage command $v_q^*$ so that an error, that is, a difference between the value of the q-axis current command $i_q^*$, which is the target value of the q-axis current, and the value of the q-axis current $i_q$ is zero. As a generation means for generating the d-axis voltage command $v_d^*$ and the q-axis voltage command $v_q^*$, for example, there is proportional Integral (PI) control. That is, regarding the d-axis current, first, the difference between the value of the d-axis current command $i_d^*$ and the value of the d-axis current $i_d$ is obtained. The proportional integral processing is then performed on the difference, and the result of the proportional integration can be the d-axis voltage command $v_d^*$. Similarly, regarding the q-axis current, the proportional integral processing is performed on the difference between the value of the q-axis current command $i_q^*$ and the value of the q-axis current $i_q$, and the result of the proportional integration can be the q-axis voltage command $v_q^*$.

Voltage command amplitude calculator 12 captures the voltage commands $v_d^*$ and $v_q^*$ output from current vector controller 11 to inverse dq converter 8. Voltage command amplitude calculator 12 performs a calculation based on following Equation (2) using the captured voltage commands $v_d^*$ and $v_q^*$, and calculates a voltage command amplitude $v_{fb}$, which is a vector with $v_d^*$ as a d-axis component and $v_q^*$ as a q-axis component.

[Math. 2]

$$v_{fb} = \sqrt{v_d^{*2} + v_q^{*2}} \quad \text{Equation (2)}$$

Note that the voltage command amplitude $v_{fb}$ may be corrected by use of a detected value (not illustrated) of a DC bus voltage of inverter 2 so that the voltage value reflects the fluctuation of the power supply voltage.

Magnetic-flux weakening controller 13 uses the voltage command amplitude $v_{fb}$ input from voltage command amplitude calculator 12 and a reference voltage $v_{rf}$ input from the reference voltage limiter to generate a negative pre-limit d-axis current command $i_{d0}^*$ including zero. Specifically, when the value of the voltage command amplitude $v_{fb}$ exceeds the value of the reference voltage $v_{rf}$, a calculation is performed so that the pre-limit d-axis current command $i_{d0}^*$ is further increased in a negative direction. For example, a difference between the value of the voltage command amplitude $v_{fb}$ and the value of the reference voltage $v_{rf}$ is integrated and calculated, and the pre-limit d-axis current command $i_{d0}^*$ proportional to the result of this integral calculation is output. Note that, in the present exemplary embodiment, "increasing a negative command in the negative direction" means changing the negative command in the negative direction so that an absolute value of the negative command increases, that is, changing the negative command in a direction away from zero.

Furthermore, since a positive d-axis current is not necessary for the magnetic-flux weakening control, magnetic-flux weakening controller 13 may limit the pre-limit d-axis current command $i_{d0}^*$ to a limit value in a positive direction. Here, in the present exemplary embodiment, since the pre-limit d-axis current command $i_{d0}^*$ is negative, the limit value in the positive direction is a limit value for a change in a direction approaching zero. The limit value in the positive direction may be zero, or may be a negative value $I_{DMAX}$ calculated by use of the normal current command phase β and the normal current command amplitude I as shown in Equation (3). For example, in a case where the limit value is set to zero, the pre-limit d-axis current command $i_{d0}*$ is limited, when the result of the change in the positive direction exceeds zero, so that the result of the change in the positive direction does not exceed zero.

[Math. 3]

$$\begin{cases} I_{DMAX} = -I \cdot \sin\beta \\ I = f(\tau^*) \end{cases} \quad \text{Equation (3)}$$

Here, the normal current command phase $\beta$ and the normal current command amplitude I are a phase and an amplitude of the current command in the normal operating region where the voltage saturation does not occur. The function f is a function of the corrected torque command $\tau^*$ for obtaining the normal current command amplitude I. The normal current command phase $\beta$, the normal current command amplitude I, and the function f need to be obtained in advance based on a relationship between the actual torque and the actual current vector of motor 1. The normal current command phase $\beta$ may be a fixed value, or may be changed according to the drive speed $\omega$ and the corrected torque command $\tau^*$ or the torque command $\tau_0*$ in order to suppress the copper loss and the iron loss of motor 1. Note that the function f may be a mathematical expression or a numerical table based on the same expression.

An action of magnetic-flux weakening controller 13 configured as described above will be described below.

When the voltage command amplitude $v_{fb}$ is larger than the reference voltage $v_{rf}$ due to an increase in the drive speed or the like, the negative pre-limit d-axis current command $i_{d0}*$ including zero increases in the negative direction, that is, changes in so as to be away from zero. On the other hand, when the voltage command amplitude $v_{fb}$ is smaller than the reference voltage $v_{rf}$, the pre-limit d-axis current command $i_{d0}*$ changes so as to approach zero. As a result, the magnetic-flux weakening control is performed so that the voltage command amplitude $v_{fb}$ does not exceed the reference voltage $v_{rf}$.

Current limiter 14 performs a calculation based on Equation (4) using the q-axis current command $i_q*$, and calculates a negative limit value $i_{d\_lmt}$ of the d-axis current command $i_d*$. Specifically, current limiter 14 limits the pre-limit d-axis current command $i_{d0}*$ input from magnetic-flux weakening controller 13 within the limit value That is, when the negative pre-limit d-axis current command $i_{d0}*$ including zero is closer to zero than the limit value $i_{d\_lmt}$, current limiter 14 outputs the pre-limit d-axis current command $i_{d0}*$ as it is. On the other hand, when the negative pre-limit d-axis current command $i_{d0}*$ exceeds the limit value $i_{d\_lmt}$ in the direction away from zero, current limiter 14 outputs the limit value $i_{d\_lmt}$ instead of the pre-limit d-axis current command $i_{d0}*$. In Equation (4), $I_{MAX}$ is the maximum value of the magnitude of a current command vector of the motor (hereinafter referred to as "current limit value") whose d-axis component is the d-axis current command $i_d*$ and whose q-axis component is the q-axis current command $i_q*$. In this way, the d-axis current command $i_d*$, which is the target value of the d-axis current, is output from current limiter 14 and supplied to current vector controller 11.

[Math. 4]

$$i_{d\_lmt} = -\sqrt{I_{MAX}^2 - i_q^{*2}} \quad \text{Equation (4)}$$

With current limiter 14 configured as described above, it is possible to limit the magnitude of the current command vector of the motor, which is the sum of the d-axis current command $i_d*$ and the q-axis current command $i_q*$ (hereinafter referred to as "combined current value"), so that the combined current value does not exceed the current limit value $I_{MAX}$.

Figure 2:
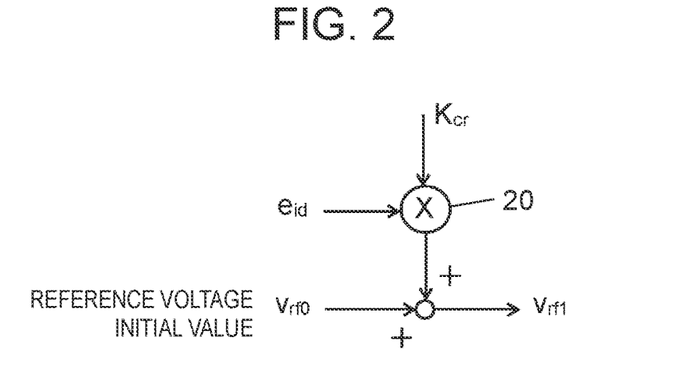
FIG. 2 is a circuit diagram of a reference voltage correction unit of the motor control device according to the exemplary embodiment of the present invention.

Reference voltage correction unit 15 increases a pre-limit reference voltage $v_{rf1}$ according to the magnitude of a difference $e_{id}$ obtained by subtracting the pre-limit d-axis current command $i_{d0}*$ from the d-axis current command $i_d*$ (hereinafter referred to as d-axis current command limit difference $e_{id}$). FIG. 2 is a circuit diagram of reference voltage correction unit 15 of motor control device 5 according to the exemplary embodiment of the present invention. As illustrated in FIG. 2, reference voltage correction unit 15 first multiplies the d-axis current command limit difference $e_{id}$ by a reference voltage correction coefficient $K_{cr}$ by multiplier 20. Reference voltage correction unit 15 then adds the multiplication result to a reference voltage initial value $v_{rf0}$ and outputs the addition result as the pre-limit reference voltage $v_{rf1}$.

A set value of the reference voltage correction coefficient $K_{cr}$ is not particularly limited, but it is desirable to determine the set value so that the reference voltage correction coefficient $K_{cr}$ has inverse characteristics of transmission characteristics of magnetic-flux weakening controller 13. For example, in the case where magnetic-flux weakening controller 13 generates the pre-limit d-axis current command $i_{d0}*$ by the integral calculation, it is desirable that the reference voltage correction coefficient $K_{cr}$ is a reciprocal of an integral gain in the integral calculation.

Figure 3:
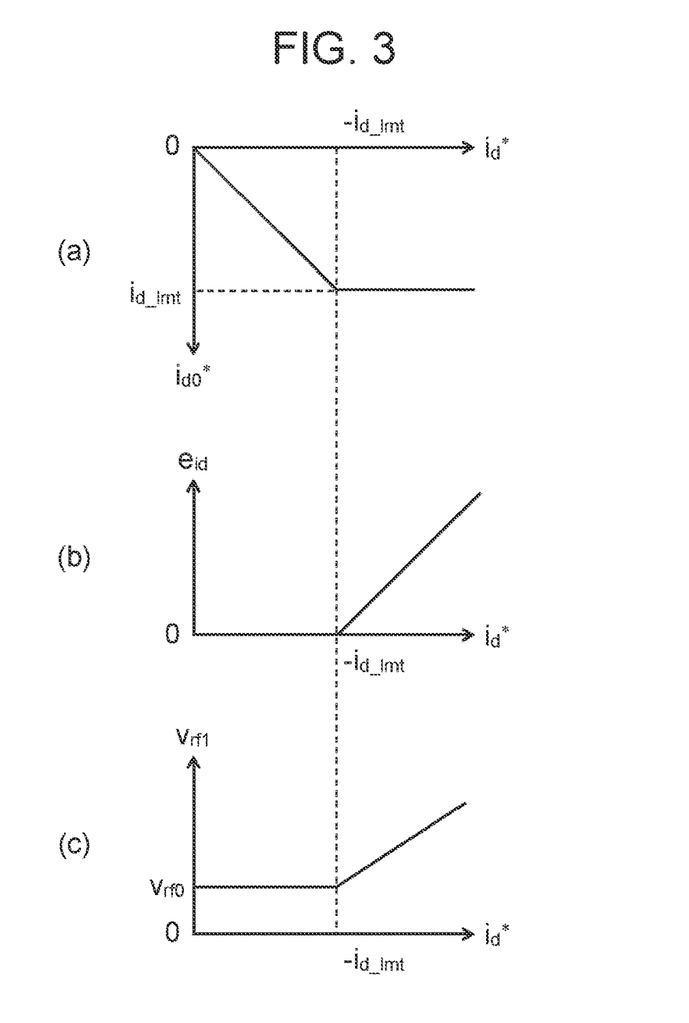
FIG. 3 is a diagram for describing the operation of a current limiter and the reference voltage correction unit of the motor control device according to the exemplary embodiment of the present invention.

The operation of current limiter 14 and reference voltage correction unit 15 configured as described above will be described with reference to FIG. 3. FIG. 3 is a diagram for describing the operation of current limiter 14 and reference voltage correction unit 15 of motor control device 5 according to the exemplary embodiment of the present invention. In FIG. 3, a part (a) of FIG. 3 illustrates a relationship between the d-axis current command $i_d*$ and the pre-limit d-axis current command $i_{d0}*$, a part (b) of FIG. 3 illustrates a relationship between the d-axis current command $i_d*$ and the d-axis current command limit difference $e_{id}$, and a part (c) of FIG. 3 illustrates a relationship between the d-axis current command $i_d*$ and the pre-limit reference voltage $v_{rf1}$.

In a situation where the speed of the motor increases and the magnetic-flux weakening control is performed, until the pre-limit d-axis current command $i_{d0}*$ is limited by the negative limit value $i_{d\_lmt}$, as illustrated in the part (a) of FIG. 3, the d-axis current command limit difference $e_{id}$ is zero, as illustrated in the part (b) of FIG. 3. Therefore, until the limitation is performed, the pre-limit reference voltage $v_{rf1}$ output from reference voltage correction unit 15 is equal to the reference voltage initial value $v_{rf0}$, as illustrated in the part (c) of FIG. 3. On the other hand, in a situation where the pre-limit d-axis current command $i_{d0}*$ is limited by the negative limit value $i_{d\_lmt}$, as illustrated in the part (a) of FIG. 3, the d-axis current command limit difference $e_{id}$ is a value larger than zero, as illustrated in the part (b) of FIG. 3. Therefore, when the limitation is performed, the pre-limit reference voltage $v_{rf1}$ output from reference voltage correction unit 15 is a value larger than the reference voltage initial value $v_{rf0}$, as illustrated in the part (c) of FIG. 3.

In the present exemplary embodiment, current limiter 14 and reference voltage correction unit 15 configured as described above enable correction of the reference voltage at the time of the magnetic-flux weakening control in a case where the combined current value reaches the current limit value $I_{MAX}$. Therefore, even in an operating region where the d-axis current cannot sufficiently flow due to the current limitation, an output voltage is increased, which can increase the speed.

For example, a case where the maximum voltage value for sinusoidal pulse width modulation (PWM) control is set as the reference voltage initial value $v_{rf0}$ will be described. In this case, the sinusoidal PWM control is performed in an operating region where the combined current value is less than the current limit value $I_{MAX}$, and overmodulation PWM control is performed in an operating region where the combined current value is limited by the current limit value $I_{MAX}$. Therefore, even if the d-axis current cannot sufficiently flow due to the current limitation, the output voltage is increased due to the overmodulation, which can increase the speed.

Incidentally, the overmodulation is widely used in railway and other industries, but an inverter output voltage is distorted in a non-sinusoidal manner. It is known that due to this distortion, a harmonic component is superimposed on the output voltage and the winding current, and the motor vibrates due to this harmonic component.

Regarding such inconvenience, in the present exemplary embodiment, in a situation where the speed of the motor increases, the magnetic-flux weakening control is preferentially executed over the above-described correction of the output voltage such as overmodulation. Current limiter 14 and reference voltage correction unit 15 perform the overmodulation only in the case where the combined current value is limited by the current limit value $I_{MAX}$. As a result, an operating region where the overmodulation is performed is made smaller than an operating region where the magnetic-flux weakening control is performed. Therefore, according to the present exemplary embodiment, a region where the harmonic component associated with the overmodulation is generated can be suppressed to be small.

Reference voltage limiter 16 limits the pre-limit reference voltage $v_{rf1}$ input from reference voltage correction unit 15 to the maximum voltage value that can be output by inverter 2 (hereinafter referred to as "maximum voltage value"), and outputs the maximum voltage value as the reference voltage $v_{rf}$ to magnetic-flux weakening controller 13.

Furthermore, reference voltage limiter 16 outputs the voltage limit difference $e_{rf}$ to command correction unit 9. This voltage limit difference $e_{rf}$ is output so that voltage limit difference $e_{rf}$ is a positive value when the voltage command amplitude $v_{fb}$ is larger than the maximum voltage value, and is zero when the voltage command amplitude $v_{fb}$ is less than or equal to the maximum voltage value.

Reference voltage limiter 16 and command correction unit 9 configured as described above performs correction so that the corrected torque command $\tau^*$ is decreased when the voltage command amplitude $v_{fb}$ is larger than the maximum voltage value. Otherwise, the corrected torque command $\tau^*$ is not corrected. Therefore, when the torque command $\tau_0^*$ that exceeds an output limit of the motor is input, the torque command $\tau_0^*$ is automatically corrected to the corrected torque command $\tau^*$ according to the output limit of the motor. As a result, a windup phenomenon of an integral term of current vector controller 11 can be prevented, and stable current control can be maintained.

Modified Example

A modified example of the exemplary embodiment will be described.

Figure 4:
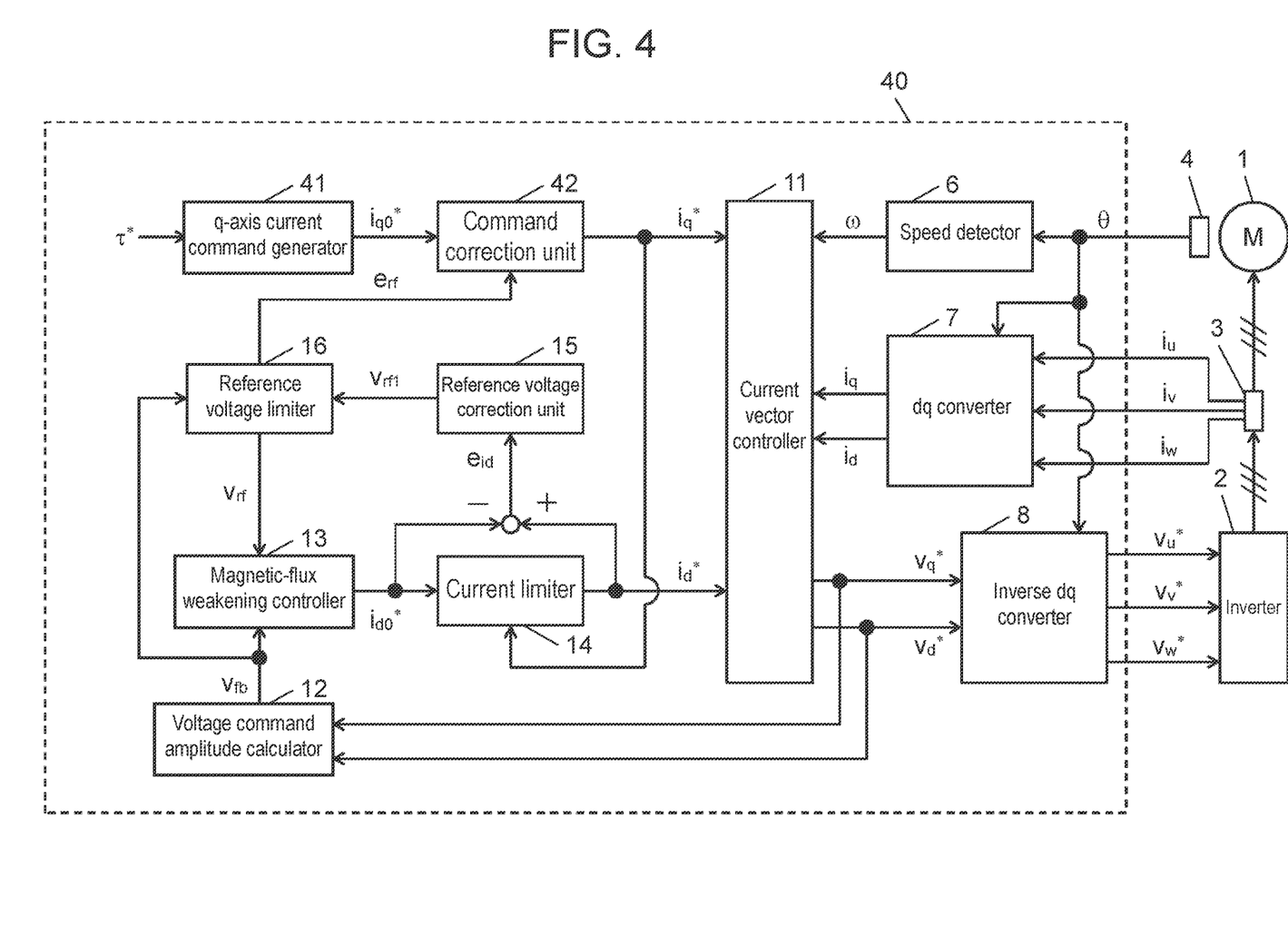
FIG. 4 is a functional block diagram illustrating a motor control device of a modified example of the present invention.

FIG. 4 is a functional block diagram illustrating motor control device 40 of the modified example of the present invention.

In FIG. 4, components similar to those in FIG. 1 are designated by the same reference marks, and the description thereof will be omitted. In FIG. 1 shown in the exemplary embodiment, command correction unit 9 performs correction to decrease the torque command $\tau_0^*$ from the upper controller (not illustrated) based on the voltage limit difference $e_{rf}$ input from reference voltage limiter 16, and outputs the corrected torque command $\tau^*$. Instead, command correction unit 42 of motor control device 40 in the present modified example performs correction to decrease a pre-correction q-axis current command $i_{q0}^*$ input from q-axis current command generator 41 based on the voltage limit difference $e_{rf}$ input from reference voltage limiter 16, and outputs the q-axis current command $i_q^*$. Furthermore, in FIG. 1, q-axis current command generator 10 generates the q-axis current command $i_q^*$, which is the target value of the q-axis current, based on the corrected torque command $\tau^*$ input from command correction unit 9. Instead, q-axis current command generator 41 of motor control device 40 in the present modified example generates the pre-correction q-axis current command $i_{q0}^*$, which is the target value of the q-axis current, based on the torque command $\tau^*$ from the upper controller (not illustrated), and outputs the pre-correction q-axis current command $i_{q0}^*$ to command correction unit 42.

Even with such a configuration, actions and effects similar to those of the above-described exemplary embodiment can be obtained.

As described above, motor control device 5 of the present exemplary embodiment controls a current of a motor based on a torque command, the current being separated into a d-axis current and a q-axis current orthogonal to the d-axis current, the torque command being a target value of a torque of the motor. Motor control device 5 includes current vector controller 11 that receives input of a d-axis current command $i_d^*$ and a q-axis current command $i_q^*$, and generates a d-axis voltage command $v_d^*$ and a q-axis voltage command $v_q^*$, a difference between a value of a d-axis current $i_d$ and a value of the d-axis current command $i_d^*$ being zero, a difference between a value of a q-axis current $i_q$ and a value of the q-axis current command $i_q^*$ being zero, q-axis current command generator 10 that generates the q-axis current command $i_q^*$ based on a torque command $\tau^*$, magnetic-flux weakening controller 13 that generates a d-axis current command $i_{d0}^*$ based on a voltage command and a reference voltage $v_{rf}$, the voltage command being a vector with the d-axis voltage command $v_d^*$ output from current vector controller 11 as a d-axis component and the q-axis voltage command $v_q^*$ as a q-axis component, an amplitude $v_{fb}$ of the voltage command not exceeding the reference voltage $v_{rf}$, current limiter 14 that limits a magnitude of the d-axis current command $i_q^*$ according to a magnitude of the q-axis current command $i_q^*$, the d-axis current command $i_d^*$ being a d-axis component of a current command vector of the motor, the q-axis current command $i_q^*$ being a q-axis component of the current command vector of the motor, a magnitude of the current command vector of the motor not exceeding a current limit value $I_{MAX}$, and reference voltage correction unit 15 that corrects the reference voltage $v_{rf}$ based on a difference between a value of the d-axis current command $i_d^*$ before limitation and a value of the d-axis current command $i_d^*$ after the limitation.

With such a configuration, when the magnitude of the current command vector reaches the current limit value $I_{MAX}$, the reference voltage $v_{rf}$ at the time of the magnetic-flux weakening control is corrected. Therefore, even in an operating region where the d-axis current cannot sufficiently flow due to the current limitation, an output voltage is increased, which can increase the speed, and can further bring out the output of the motor.

Furthermore, as a preferable example, motor control device 5 may further include reference voltage limiter 16 that limits the reference voltage $v_{rf}$ by a predetermined upper limit value, and command correction unit 9 that performs correction to decrease the q-axis current command $i_q^*$ or the torque command when the amplitude $v_{fb}$ of the voltage command is larger than the predetermined upper limit value.

INDUSTRIAL APPLICABILITY

A motor control device of the present invention can be applied to motors that are driven in a voltage saturation region, for example, motors that drive industrial machines, automobiles, automobile parts, trains, home appliances, fluid machines, construction machines, or the like, which need to be driven at high speed with a large torque instantaneously or intermittently.

REFERENCE MARKS IN THE DRAWINGS 1 motor
2 inverter
3 current detector
4 position detector
5 motor control device
6 speed detector
7 dq converter
8 inverse dq converter
9 command correction unit
10 q-axis current command generator
11 current vector controller
12 voltage command amplitude calculator
13 magnetic-flux weakening controller
14 current limiter
15 reference voltage correction unit
16 reference voltage limiter
20 multiplier
40 motor control device
41 q-axis current command generator
42 command correction unit

The invention claimed is:

1. A motor control device that controls a current of a motor based on a torque command, the current being separated into a d-axis current and a q-axis current orthogonal to the d-axis current, the torque command being a target value of a torque of the motor, the motor control device comprising:
   a current vector controller that receives a d-axis current command and a q-axis current command, and generates a d-axis voltage command and a q-axis voltage command, a difference between a value of the d-axis current and a value of the d-axis current command being zero, a difference between a value of the q-axis current and a value of the q-axis current command being zero;
   a q-axis current command generator that generates the q-axis current command based on the torque command;
   a magnetic-flux weakening controller that generates the d-axis current command based on a difference between a voltage command and a reference voltage, the voltage command being a vector with the d-axis voltage command output from the current vector controller as a d-axis component and the q-axis voltage command as a q-axis component, an amplitude of the voltage command not exceeding the reference voltage;
   a current limiter that limits a magnitude of the d-axis current command according to a magnitude of the q-axis current command, the d-axis current command being a d-axis component of a current command vector of the motor, the q-axis current command being a q-axis component of the current command vector of the motor, a magnitude of the current command vector of the motor not exceeding a current limit value; and
   a reference voltage correction unit that is configured to correct the reference voltage at a time of a magnetic-flux weakening control when a combined current value reaches a current limit value, the combined current being sum of the value of the d-axis current command and the value of the q-axis current command, wherein the reference voltage correction unit corrects the reference voltage based on a magnitude of a difference between the d-axis current command provided to the current limiter and the d-axis current command output by the current limiter.

2. The motor control device according to claim 1, further comprising:
   a reference voltage limiter that limits the reference voltage to a predetermined upper limit value; and
   a command correction unit that performs correction to decrease the q-axis current command or the torque command when the amplitude of the voltage command is larger than the predetermined upper limit value.

* * * * *